2,749,319
CELLULOSE ACETATE SORBATE AND COMPOSITIONS THEREOF

William B. Hewson, Wilmington, Del., assignor to Hercules Powder Company, Wilmington, Del., a corporation of Delaware No Drawing. Application October 2, 1952, Serial No. 312,857

19 Claims. (Cl. 260—17)

This invention relates to cellulose acetate sorbate compositions and to improvements in the cross-linking thereof.

It is known to insolubilize cellulose esters having polymerizable unsaturated radicals by means of polymerization catalysts. The usual catalysts useful for the purpose are also known to be catalysts for the degradation of cellulose and are objectionable for that reason. In order to avoid degradation of the cellulose chain, the catalysts have heretofore been kept at a minimum at the risk of incomplete cross-linking. Moreover, cellulose esters having a relatively high D. S. of unsaturated radicals have been required to compensate for the reduced amount of catalyst. These disadvantages have had a strong influence in holding back the commercial development of this type of cross-linkable cellulose ester.

In accordance with the present invention, cellulose acetate sorbate has been found to be cross-linkable, without disadvantages of prior art catalysts, by heating with a Diels-Alder polyfunctional dienophile. While the cross-linking reaction here involved does not require a catalyst, small amounts of catalysts may be used, if desired, to reduce the content of polymerizable unsaturated radicals.

By the term "polyfunctional dienophile" as used in this specification and claims is meant a compound having two or more centers of unsaturation, each capable of undergoing the Diels-Alder reaction with a diene, exemplified by butadiene.

The following examples illustrate the method and useful compositions of this invention. All parts and percentages are by weight unless otherwise noted.

EXAMPLES

Solutions of 85–95 parts cellulose acetate sorbate (acetyl D. S. 2.39, sorboyl D. S. 0.06) admixed with 5–15 parts Diels-Alder polyfunctional dienophile in 9:1 (by volume) acetone-ethanol were cast to form 3 mil films. After evaporation of the solvent, the films were heated at 155–160° C. to effect cross-linking. In some instances, 2% (based on film weight) benzoyl peroxide was included in the solution used in casting the film. Solubility tests were made by weighing the film before and after immersion for 3 hours at room temperature in acetone. For comparative purposes, films of cellulose acetate sorbate with diethyl phthalate in place of the dienophile were similarly treated. The data are shown in Table 1.

The dienophile instead of being homogeneously distributed in the cellulose acetate sorbate composition may also be used as a surface-treating agent. In the examples of Table 2 the dienophile was dissolved in a solvent to form solutions of the concentration shown and the unplasticized cellulose acetate sorbate in the form of a 41 filament yarn (150 denier) was immersed therein for a short period of time at a temperature in the range of 25°–95° C. After drying, and heating to reaction temperature, the solubility of the film in acetone was determined in the manner indicated above. In those cases where the solvent immersion temperature was 90°–95° C., insolubilization was noted to have taken place to a large degree even before the further heat-treatment. The blanks were filaments of unplasticized cellulose acetate sorbate treated with the solvent containing no dienophile.

Cellulose acetate sorbate treated with dienophiles containing nitrogen in the molecule, besides having greater insolubility characteristics, also has improved dyeing characteristics. For example, cellulose acetate sorbate combined with 5% methylene bisacrylamide in the above-described manner was dyed by heating for five minutes in a hot (90°–95° C.) solution of Pontacyl Wool Blue BL (0.5 gram per 100 ml. water). The yarn so treated adsorbed this wool dye strongly, to a degree more like wool than a cellulose ester. Cellulose acetate sorbate treated with other nitrogen containing dienophiles such as triallyl cyanurate and acrylamides also shows this improved dye receptivity.

Table 1

| Example | Dienophile | Percent | Catalyst | Percent Acetone Solubility After Heating at 155–160° C. | |
|---|---|---|---|---|---|
| | | | | 6 Min. | 20 Min. |
| 1 | Triallyl Cyanurate | 5 | Yes | 17 | |
| 2 | Diallylidene-pentaerythritol Diacetal | 5 | Yes | 18 | |
| 3 | Diallyl Maleate | 5 | Yes | 21 | |
| 4 | Diallyl Fumarate | 5 | Yes | 17 | |
| 5 | Triallyl Citrate | 5 | Yes | 15 | |
| 6 | Methylene Bisacrylamide | 5 | Yes | 6 | |
| 7 | Triallyl Cyanurate | 5 | No | | 80 |
| 8 | do | 15 | No | 70 | 31 |
| 9 | Diallylidene-pentaerythritol Diacetal | 5 | No | 62 | |
| 10 | do | 15 | No | 50 | 24 |
| 11 | Methylene Bisacrylamide | 5 | No | 59 | |
| 12 | do | 10 | No | 15 | |
| 13 | do | 15 | No | 12 | |
| Blank | None (Diethyl Phthalate) | 5 | Yes | 28 | |
| Blank | do | 5 | No | 100 | 100 |

Table 2

| Example | Dienophile | Solvent | Percent Conc. | Immersion Time (Min.) | Immersion Temperature | Treatment Temperature, °C. | Percent Acetone Solubility After 10 Min. Treatment |
|---|---|---|---|---|---|---|---|
| 14 | Methylene Bisacrylamide | Water | 5 | 0.2 | 25 | 150 | 85 |
| 15 | ...do... | ...do... | 5 | 2.0 | 25 | 150 | 50 |
| 16 | ...do... | ...do... | 10 | 0.2 | 25 | 150 | 40 |
| 17 | ...do... | ...do... | 10 | 2.0 | 25 | 150 | 20 |
| 18 | ...do... | ...do... | 20 | 1.0 | 25 | 175 | 5 |
| 19 | ...do... | ...do... | 5 | 1.0 | 95 | ¹ 95 | 40 |
| 20 | ...do... | ...do... | 5 | 4.0 | 95 | ¹ 95 | 15 |
| 21 | ...do... | ...do... | 10 | 1.0 | 95 | ¹ 95 | 25 |
| 22 | ...do... | ...do... | 10 | 4.0 | 95 | ¹ 95 | 10 |
| 23 | Triallyl Cyanurate | CCl₄ | 9 | 1.0 | 25 | 160 | 70 |
| 24 | ...do... | CCl₄ Methanol 5:1 | 7 | 5 | 25 | 160 | 70 |
| 25 | Diallyl Cyanamide | CCl₄ | 9 | 10 | 25 | 160 | 80 |
| Blank | None | CCl₄ | | 10 | 25 | 160 | 100 |
| Blank | ...do... | Water | | 10 | 25 | 160 | 100 |

¹ Immersion treatment.

The insolubilizing reaction of this invention is believed to involve a cross-linking reaction of the Diels-Alder type, the sorbate group providing the diene group for the Diels-Alder reaction. The reaction between the dienophile and two sorbate radicals is believed to be the simplest of the reactions involved. However, when considered in detail reactions come into consideration which are based on the primary reaction of one sorbate radical with one functional group of the dienophile leaving a residual functional group of the dienophile available for a secondary reaction with another sorbate radical, as mentioned above, with another residual dienophile functional group, or with an uncombined dienophile. Thus cross-linking may be involved between the primary Diels-Alder reaction product of a sorbate radical and a dienophile in a secondary reaction either of the Diels-Alder type or of the polymerization type.

In the absence of a catalyst, the Diels-Alder type of reaction is believed to predominate. The secondary reaction is slower and the polymerization type of reaction may require small amounts of polymerization catalysts.

The primary reaction usually requires temperatures in the range of 50°–200° C. and a temperature is selected which gives a satisfactory reaction rate and which is below that which causes degradation of the cellulose chain. The secondary reaction will require a temperature in the same range but may require a temperature above 100° C. or a longer period of time unless a polymerization catalyst is present.

Catalysts which may be used where desired are those which are known to be polymerization catalysts and particularly the free radical generating type such as actinic light and organic and inorganic peroxidic compounds. Benzoyl peroxide, tertiary butyl peroxide, and cumene hydroperoxide are preferred catalysts.

The dienophiles suitable for use in this invention are those having two or more functional groups capable of undergoing the Diels-Alder type of reaction. Dienophiles are well known (see "Organic Reactions," volume IV, John Wiley & Sons, Inc., 1948, pages 1–173). Particularly useful in cross-linking cellulose acetate sorbate are the following polyfunctional dienophiles: diallyl esters of dicarboxylic acids such as the phthalate, terephthalate, malonate, oxalate, succinate, glutarate, maleate, fumarate, citrate, adipate, and sebacate; monoallyl esters of unsaturated acids such as the crotonate, acrylate, cinnamate, and methacrylate; diallyl ether; diallyl ketone; triallyl citrate; glycol, glycerol, and pentaerythritol esters of monocarboxylic unsaturated acids such as the crotonate, acrylate, methacrylate; diallyl cyanurates; methylene bisacrylamide; polyallyl cyanurates; diallylidene pentaerythritol diacetal; divinylbenzene; diallyl melamine; and β-vinyl acrylic esters or amides.

The amount of polyfunctional dienophile used in the cross-linking process of this invention will, in general, vary with the sorboyl D. S. of the cellulose acetate sorbate. While the chemically equivalent amount for a Diels-Alder type of cross-linking is optimum, more or less than optimum may be used, depending on the type of product desired. For instance, with a high sorboyl D. S. insolubilization can be effected by much less than the equivalent amount of dienophile. An excess of dienophile may also be used, but in such a case, a catalyst is generally desired to complete the secondary reaction. In the case of a homogeneous mixture with cellulose acetate sorbate of sorboyl D. S. in the range 0.02 to about 1.0, 5–10% dienophile is satisfactory for insolubilization and up to about as much as is compatible can be used without the necessity of a catalyst. In the latter case the excess acts as a plasticizer. For a cellulose acetate sorbate of sorboyl D. S. in the range 0.02 to about 0.35 as little as 1.0% dienophile will effect at least partial insolubilization, an equivalent amount is optimum, and an excess of the equivalent in an amount as great as is compatible can be used. To avoid undesired softening due to the presence of the dienophile, a catalyst is preferably used to insolubilize the excess dienophile when over 20% dienophile is used.

When the surface treating method is used, the concentrations of the treating solutions depend on the solubilities of the dienophiles and the nature of the solvents. Concentrations of 5–10% are preferable. The times and temperatures of immersion of the samples also depend on the properties of the dienophile. With the more reactive dienophiles and high immersion temperatures a subsequent heat-treatment is not necessary to effect insolubilization. Generally the range of temperatures for immersion is 20–100° C. and reaction times of 0.2 to 10 minutes are optimum.

The sorboyl D. S. of the cellulose acetate sorbate useful in this invention is within the range 0.02 to about 0.35 and the total D. S. is in the range of 2.2 to 3.0.

Suitable cellulose acetate sorbate is prepared by esterifying cellulose with an anhydride mixture of organic acids, wherein the acids consist essentially of sorbic acid in an amount within the range of about 0.0023 to about 0.13 mole fraction of the organic acids and the remainder of the acids is acetic acid and the anhydride in the mixture is at least 3 moles per anhydroglucose unit of the cellulose. Sulfuric acid is used as a catalyst in minimum effective amounts and methylene chloride is used as a solvent. The cellulose acetate sorbate produced will have a sorboyl D. S. in the range of about 0.01 to about 0.35, depending on the mole fraction of sorbic acid in the anhydride mixture. The total D. S. of such a product will generally be about 3.0. To get a product of lower total D. S. the fully esterfied product is subjected to partial hydrolysis using an organic sulfonic acid such as benzene- or toluene-sulfonic acid as a catalyst and aqueous acetic acid as the hydrolyzing medium.

The cross-linkable compositions of this invention are useful as molding compositions, films, filaments, and other shaped bodies which can be insolubilized during or after being put into a useful form. The insolubilized articles are resistant to hydrocarbon solvents, dry cleaning solvents and grease and due to this resistance are particularly useful as protective films and as filaments from which fabrics can be woven and as shaped articles which do not soften due to contact with grease such as brush bristles, combs, and the like. Textiles made from the filaments exhibit ability to withstand higher ironing temperatures, better crease resistance and better dimension stability when wet. Also, by means of this treatment one important embodiment lies in the advantageous dyeing properties which are brought out when nitrogen containing dienophiles are used and nitrogen is thus introduced into the cellulose acetate sorbate molecule. In this manner yarns may be produced for making fabrics which behave more like wool in dyeing with wool dyes and which after dyeing have greater color stability. This treatment thus makes the much larger group of wool dyes available for these cellulosic materials.

What I claim and desire to protect by Letters Patent is:

1. The method of insolubilizing cellulose acetate sorbate having a sorboyl D. S. within the range of 0.02 to about 0.35 and a total D. S. in the range of 2.2 to 3.0 which comprises heating cellulose acetate sorbate at a temperature above about 50° C. and below its decomposition point with a dienophile having at least two centers of unsaturation, each capable of undergoing the Diels-Alder reaction.

2. The method of insolubilizing cellulose acetate sorbate having a sorboyl D. S. within the range of 0.02 to about 0.35 and a total D. S. in the range of 2.2 to 3.0 which comprises heating cellulose acetate sorbate at a temperature above about 50° C. and below its decomposition point with methylene bisacrylamide.

3. The method of insolubilizing cellulose acetate sorbate having a sorboyl D. S. within the range of 0.02 to about 0.35 and a total D. S. in the range of 2.2 to 3.0 which comprises heating cellulose acetate sorbate at a temperature above about 50° C. and below its decomposition point with triallyl cyanurate.

4. The method of insolubilizing cellulose acetate sorbate having a sorboyl D. S. within the range of 0.02 to about 0.35 and a total D. S. in the range of 2.2 to 3.0 which comprises heating cellulose acetate sorbate at a temperature above about 50° C. and below its decomposition point with diallyl malleate.

5. The method of insolubilizing cellulose acetate sorbate having a sorboyl D. S. within the range of 0.02 to about 0.35 and a total D. S. in the range of 2.2 to 3.0 which comprises heating cellulose acetate sorbate at a temperature above about 50° C. and below its decomposition point with triallyl citrate.

6. The method of insolubilizing cellulose acetate sorbate having a sorboyl D. S. within the range of 0.02 to about 0.35 and a total D. S. in the range of 2.2 to 3.0 which comprises heating cellulose acetate sorbate at a temperature above about 50° C. and below its decomposition point with diallyl phthalate.

7. The method of increasing the resistance of a cellulose acetate sorbate shaped article to solubility in organic solvents wherein said cellulose acetate sorbate has a sorboyl D. S. in the range of 0.02 to about 0.35 and a total D. S. in the range of 2.2 to 3.0 which comprises contacting said shaped article with a dienophile having at least two centers of unsaturation, each capable of undergoing the Diels-Alder reaction until the surface of said article comprises a coating of cellulose acetate sorbate plasticized with said dienophile and heating the shaped article at a temperature above about 50° C. and below its decomposition point.

8. As a new composition of matter cellulose acetate sorbate having a sorboyl D. S. within the range of 0.02 to about 0.35 and a total D.S. in the range of 2.2 to 3.0 in admixture with a dienophile having at least two centers of unsaturation, each capable of undergoing the Diels-Alder reaction.

9. As a new composition of matter cellulose acetate sorbate having a sorboyl D. S. within the range of 0.02 to about 0.35 and a total D. S. in the range of 2.2 to 3.0 in admixture with methylene bisacrylamide.

10. As a new composition of matter cellulose acetate sorbate having a sorboyl D. S. within the range of 0.02 to about 0.35 and a total D. S. in the range of 2.2 to 3.0 in admixture with triallyl cyanurate.

11. As a new composition of matter cellulose acetate sorbate having a sorboyl D. S. within the range of 0.02 to about 0.35 and a total D. S. in the range of 2.2 to 3.0 in admixture with diallyl maleate.

12. As a new composition of matter cellulose acetate sorbate having a sorboyl D. S. within the range of 0.02 to about 0.35 and a total D. S. in the range of 2.2 to 3.0 in admixture with triallyl citrate.

13. As a new composition of matter cellulose acetate sorbate having a sorboyl D. S. within the range of 0.02 to about 0.35 and a total D. S. in the range of 2.2 to 3.0 in admixture with diallyl phthalate.

14. As a new composition of matter an organic solvent resistant shaped article comprising the reaction product of cellulose acetate sorbate having a sorboyl D. S. within the range of 0.02 to about 0.35 and a total D. S. in the range of 2.2 to 3.0 with a dienophile having at least two centers of unsaturation, each capable of undergoing the Diels-Alder reaction.

15. As a new composition of matter an organic solvent resistant shaped article comprising the reaction product of cellulose acetate sorbate having a sorboyl D. S. within the range of 0.02 to about 0.35 and a total D. S. in the range of 2.2 to 3.0 with methylene bisacrylamide.

16. As a new composition of matter an organic solvent resistant shaped article comprising the reaction product of cellulose acetate sorbate having a sorboyl D. S. within the range of 0.02 to about 0.35 and a total D. S. in the range of 2.2 to 3.0 with triallyl cyanurate.

17. As a new composition of matter an organic solvent resistant shaped article comprising the reaction product of cellulose acetate sorbate having a sorboyl D. S. within the range of 0.02 to about 0.35 and a total D. S. in the range of 2.2 to 3.0 with diallyl maleate.

18. As a new composition of matter an organic solvent resistant shaped article comprising the reaction product of cellulose acetate sorbate having a sorboyl D. S. within the range of 0.02 to about 0.35 and a total D. S. in the range of 2.2 to 3.0 with triallyl citrate.

19. As a new composition of matter an organic solvent resistant shaped article comprising the reaction product of cellulose acetate sorbate having a sorboyl D. S. within the range of 0.02 to about 0.35 and a total D. S. in the range of 2.2 to 3.0 with diallyl phthalate.

References Cited in the file of this patent

UNITED STATES PATENTS 2,396,165     Ernsberger et al. _____ Mar. 5, 1946